United States Patent Office 2,734,521
Patented Feb. 14, 1956

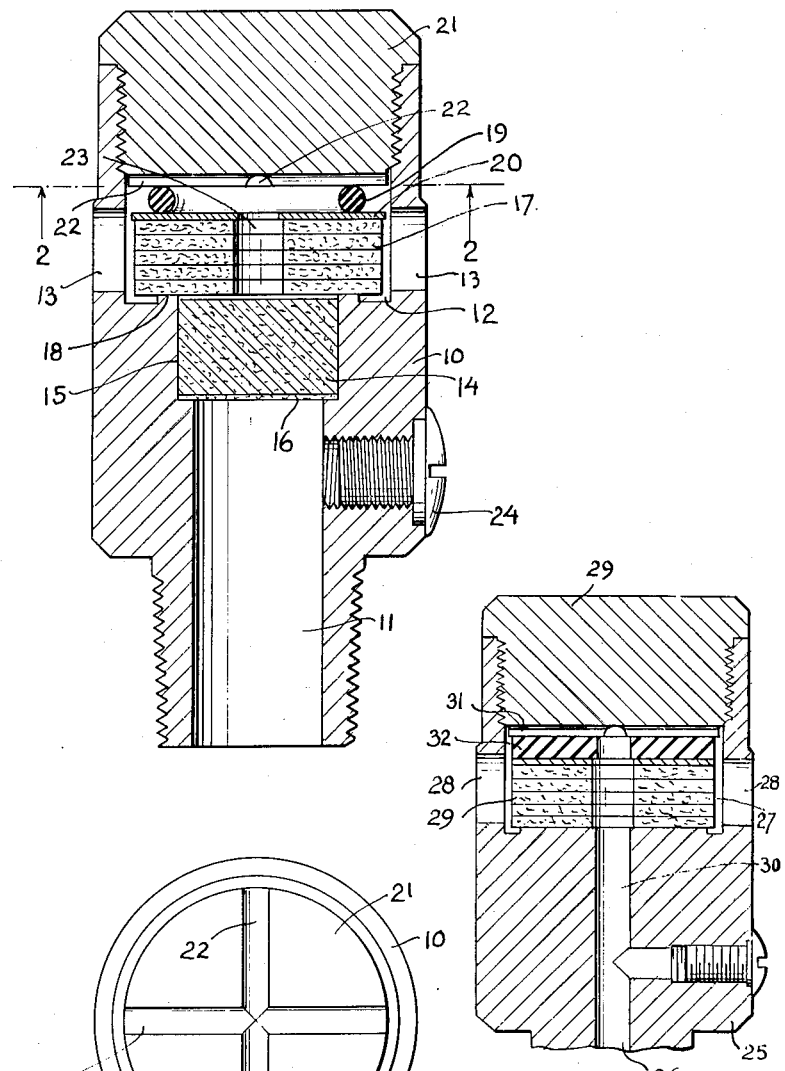

2,734,521

VENT VALVE

Harold G. Hencken, Greenwich, Conn., assignor to Taco Heaters, Incorporated, Providence, R. I., a corporation of New York Application June 14, 1952, Serial No. 293,585

3 Claims. (Cl. 137—197)

This invention relates to an automatically operating vent valve for use in a heating system and particularly a system where it is necessary to vent air or gas and yet prevent the escape of liquid or vapor.

In a heating system having radiators of conventional type, the air or gases must be vented therefrom so that the heating fluid can fill the radiator. If the radiators are not completely filled, maximum heat transmission will not be obtained. Air finds its way into a heating system in various manners and will tend to collect at the top of the radiators, thus preventing complete filling thereof.

One of the objects of the present invention is to provide a vent valve arrangement for the purpose of automatically venting air from a heating, pumping or similar system, the valve preventing the passage of water or vapor therefrom.

In one aspect of the invention, the valve body may have an inlet passage and an outlet passage connected to the inlet passage, there being a cavity in the outlet passage. A water swellable fibrous body can be located in the cavity, one portion of the swellable body or member abutting one wall of the cavity, there being a resilient water control element between the swellable body and the opposite wall of the cavity. In one form of the invention, grooves may be located in the wall of the cavity contacted by the resilient member, the resilient element or means being forced therein to close off passage through the grooves when the swellable body becomes wet. Grooves also may be cut in the resilient element itself or in the swellable body at the face contacted by the resilient water control element, or other forms of the resilient element can be used. In a more specific form, a resilient O-ring can be employed as the resilient element, the swellable member forcing the O-ring into the grooves.

In a preferred form of the invention, a rigid, porous body having capillary pores or passages extending therethrough may be used to controllably pass air to the swellable and resilient element or means by restricting the rate of flow of water from the heating system to the swellable body to such a rate that the swellable body in combination with the resilient element will close off the outlet passage properly to prevent leakage of water from the valve. The porous rigid body may have one or more capillary passages for the purpose of controlling the passage of water therethrough.

The water swellable body preferably is of a fibrous material and may be made of a plurality of wafers or elements having central apertures. The fibrous swellable body should be made of fibers which will swell a major amount when unconfined with the body wet with water or the like, as will be described hereafter. Furthermore, the swell should be sufficiently fast so as to prevent passage of water from the system.

These and other objects, advantages and features of the invention will become apparent from the following description and drawings, which are merely exemplary.

In the drawings:

Fig. 1 is an enlarged sectional view of one form of the invention.

Fig. 2 is a view taken along the line 2—2 of Fig. 1.

Fig. 3 is a sectional view of another form of the valve.

Valve body 10 may be made of any suitable material or metal such as brass, the body having an inlet passage 11. The outlet passage leading from the inlet to the exterior of the valve has a cavity 12 and main outlet apertures 13. It is to be understood that the cavity or chamber 12 does not necessarily have to be a distinct entity, the term "cavity" being used to designate the area or space in which the swellable fibrous body is located. In the form illustrated in Fig. 1 a porous plug 14 is located in an enlarged recessed portion 15 adjacent to inlet passage 11. A piece of filter paper 16 may be used if desired although such is not necessary.

Porous plug 14 can be made, for example, of porous graphite, porous bronze or porous ceramic. Preferably a porous bronze plug is used, the plug being made by conventional power metallurgy techniques. Merely by way of example, a porous bronze plug which has been found to be satisfactory will pass approximately 2 cubic centimeters of water per minute under a pressure of 30 lbs. per square inch and about 275 cubic centimeters of air per minute. When the pressure is 5 lbs. per square inch the plug will pass approximately .58 cubic centimeters of water per minute and 40 cubic centimeters of air per minute. The size of powder, means of shaping and sintering can be selected so as to produce the desired preferential control aspect of the rigid porous plug.

The porous plug can be an integral part of valve body 10 or may be in the straight wall portion of the inlet passage 11 as well as in the stepped portion. The porous plug may take various forms and when the correct combination of swellable body and resilient element is used, a single or a plurality of restricted or capillary passages can be employed, the passages being chosen to control flow at the desired rate of flow of water to the swellable body.

Swellable fibrous body 17 may be located in cavity 12 arranged so that one face is in contact with wall 18 of the cavity and the other face contacts the resilient flow control element 19, a washer or abutment member 20 being provided if desired. Screw plug 21 defining one wall of the cavity can have grooves 22 therein which remain open when the swellable fibrous body 17 is in a relatively dry state. When water reaches the swellable fibrous body, it will swell and cause resilient member 19 to enter the grooves 22 and thus shut off flow of water from inlet passage 11 through central aperture 23 and grooves 22 to the outlet apertures 13.

A satisfactory swellable fibrous body may be one having an apparent density of 0.80 to 1.40 and having an initial swell rate for the first minute of more than about 20%. When exposed to water and the body is unrestrained, the same fiber will swell 70% in five minutes. The swell rate is not necessarily a straight line relationship but must be relatively rapid or quick during the first minute. The wafers comprising the swellable fibrous body may have a central aperture 23 therethrough. A manual vent means 24 can be located in the side of the inlet passage portion of the valve body 10. The air flow through the inlet passageway may reach the exterior of the valve through aperture 23 and through the grooves 22, as well as between the wafers.

A modified form of the invention is illustrated in Fig. 3 wherein valve body 25 has an inlet passage 26 and an outlet passage with a cavity 27 and outlet apertures 28. Closure plug 29 can be screw-threadedly joined to the body 25. A swellable fibrous body 29 can have an aperture 30 therethrough. Cap 29 may have grooves 31 therein and there may be a resilient member 32 located between the swellable body and the opposite wall of the cavity. When the fibrous body 29 becomes wet it will swell and cause the resilient member to squeeze into the grooves and thus shut off flow of water from inlet passage 29 to the exterior of the valve. If desired, a porous rigid plug or capillary control means can be employed in the form shown in Fig. 3.

The resilient member may be of a suitable elastomer or rubber, it being desirable that its recovery be such as to force its way out of the groove when the force of the swellable element is removed therefrom.

It should be apparent that resilient element 32 could be made solid if desired and could have grooves in the face thereof adjacent to the swellable element, or that the grooves may be located in the top wafer of the swellable fibrous body. Also, a washer between the swellable body and the resilient element could have grooves. Other variations of the construction can be made without departing from the spirit of the invention, except as defined in the appended claims.

What is claimed is:

1. An automatic air vent valve comprising a valve body, an outlet passage in said body having a cavity therein with end walls and main outlet aperture, an inlet passage connected to said cavity, a water swellable fibrous body in said cavity, said body comprising a plurality of fibrous wafers having substantially central air passages therethrough, said water swellable body being in abutting relationship with one end wall means of said cavity, and a resilient means between said water swellable fibrous body and the opposite end wall means of said cavity, at least one of said means having groove means therein leading to the exterior of said valve, the swellable body and resilient means cooperating when the water swellable body becomes wet so that the swell rate of the swellable body is such as will close off passage of water through said groove means.

2. An automatic air vent valve comprising a valve body, an outlet passage in said body having a cavity therein with end walls, an inlet passage connected to said cavity, a water absorbent swellable fibrous body in said cavity, said fibrous body having a passage therethrough and being in abutting relationship with one end wall of said cavity, and a resilient member between said fibrous body and opposite end wall, said last mentioned end wall having grooves therein leading from said passage to the exterior of said valve, said fibrous body upon becoming wet having a swell rate such as to force said resilient member into said grooves to cut off the flow of water therethrough.

3. An automatic air vent valve comprising a valve body, an outlet passage in said body having a cavity therein with end walls, an inlet passage connected to said cavity, a water absorbent swellable fibrous body comprising a plurality of fibrous wafers in said cavity, said fibrous body wafers having an approximately central air passage, said fibrous body being in abutting relationship with one end wall of said cavity, and a resilient O-ring between said fibrous body and opposite end wall, said last mentioned end wall having grooves therein, leading from said central air passage to the exterior of said valve and through which air can pass, said fibrous body upon becoming wet having a swell rate such as to force said resilient O-ring into said grooves to cut off the flow of water therethrough.

References Cited in the file of this patent
UNITED STATES PATENTS

| | | |
|---|---|---|
| 2,153,726 | Scoppola | Apr. 11, 1939 |
| 2,460,647 | Miller | Feb. 1, 1949 |
| 2,467,217 | Mikeska | Apr. 12, 1949 |